United States Patent [19]

Weixel

[11] Patent Number: 4,621,409

[45] Date of Patent: Nov. 11, 1986

[54] HARNESS FORMATION FINGER INTERCHANGE

[75] Inventor: Mark S. Weixel, Ellicott City, Md.

[73] Assignee: Westinghouse Electric Corp., Pittsburgh, Pa.

[21] Appl. No.: 709,238

[22] Filed: Mar. 6, 1985

[51] Int. Cl.⁴ .......................................... B23Q 3/155
[52] U.S. Cl. ................................. 29/568; 29/564.1; 29/749
[58] Field of Search ............... 29/266, 568, 748, 749, 29/750, 751, 752, 753, 754, 566.3, 566.4, 564.1

[56] References Cited

U.S. PATENT DOCUMENTS

| | | |
|---|---|---|
| 3,298,098 | 1/1967 | Gleisner, Jr. .......................... 29/568 |
| 3,316,629 | 5/1967 | Meyer .................................... 29/568 |
| 3,344,511 | 10/1967 | Hosea ................................... 29/568 |
| 3,683,490 | 8/1972 | Chabrier ............................... 29/568 |
| 3,816,904 | 6/1974 | Herb ..................................... 29/568 |
| 3,997,956 | 12/1976 | McKee .............................. 29/564.1 |
| 4,048,710 | 9/1977 | Nijman .............................. 29/566.4 |
| 4,358,888 | 11/1982 | Zankl et al. .......................... 29/568 |
| 4,443,929 | 4/1984 | Bayer et al. ........................... 29/568 |
| 4,499,650 | 2/1985 | Cannon et al. ........................ 29/568 |
| 4,509,235 | 4/1985 | Sakamoto .......................... 29/26 A |
| 4,514,892 | 5/1985 | Tsujimura et al. ................... 29/568 |

FOREIGN PATENT DOCUMENTS 656803  4/1979  U.S.S.R. ................................ 29/568

Primary Examiner—Gil Weidenfeld
Assistant Examiner—Glenn L. Webb
Attorney, Agent, or Firm—E. C. Arenz

[57] ABSTRACT

The harness formation interchange for use with a robotic end-effector includes a plurality of tool storage units at each robot work station. Each of the storage units incorporates a powered tool clamping assembly consisting of power driven clamps which move in a path normal to the longitudinal axis of an insertion tool finger to be clamped thereby. Additionally, the storage units are each provided with a powered latch release unit which moves around an insertion tool finger clamped by the power driven clamps to engage and release a tool latch mounted on the robotic end-effector.

12 Claims, 6 Drawing Figures

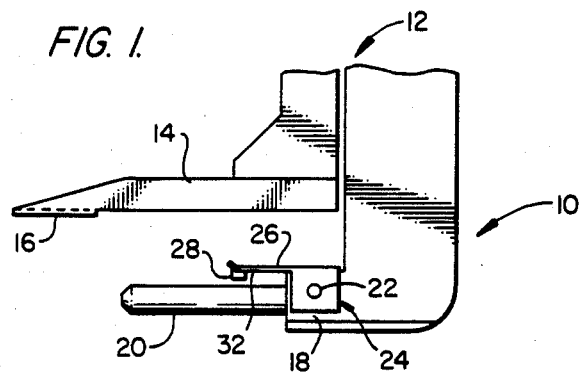
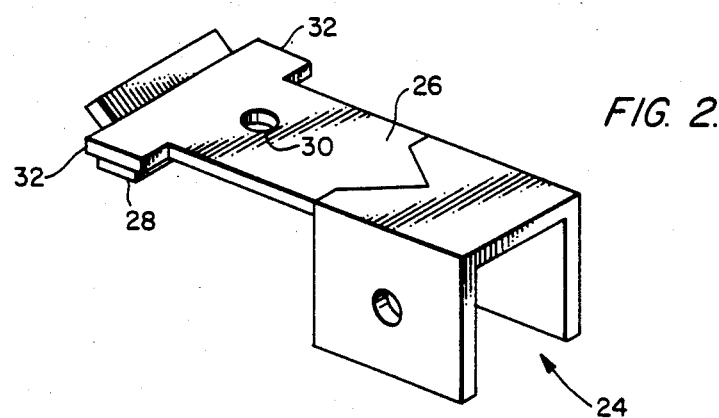
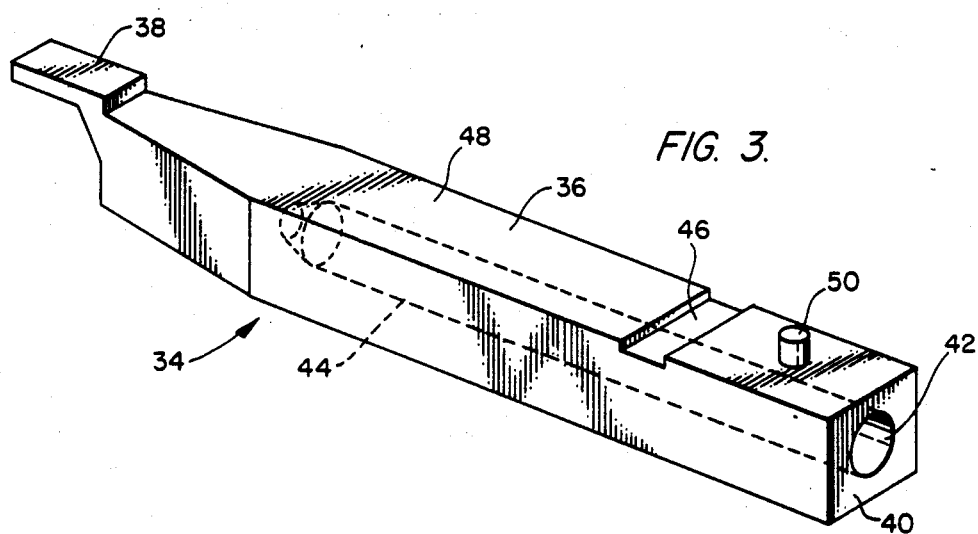

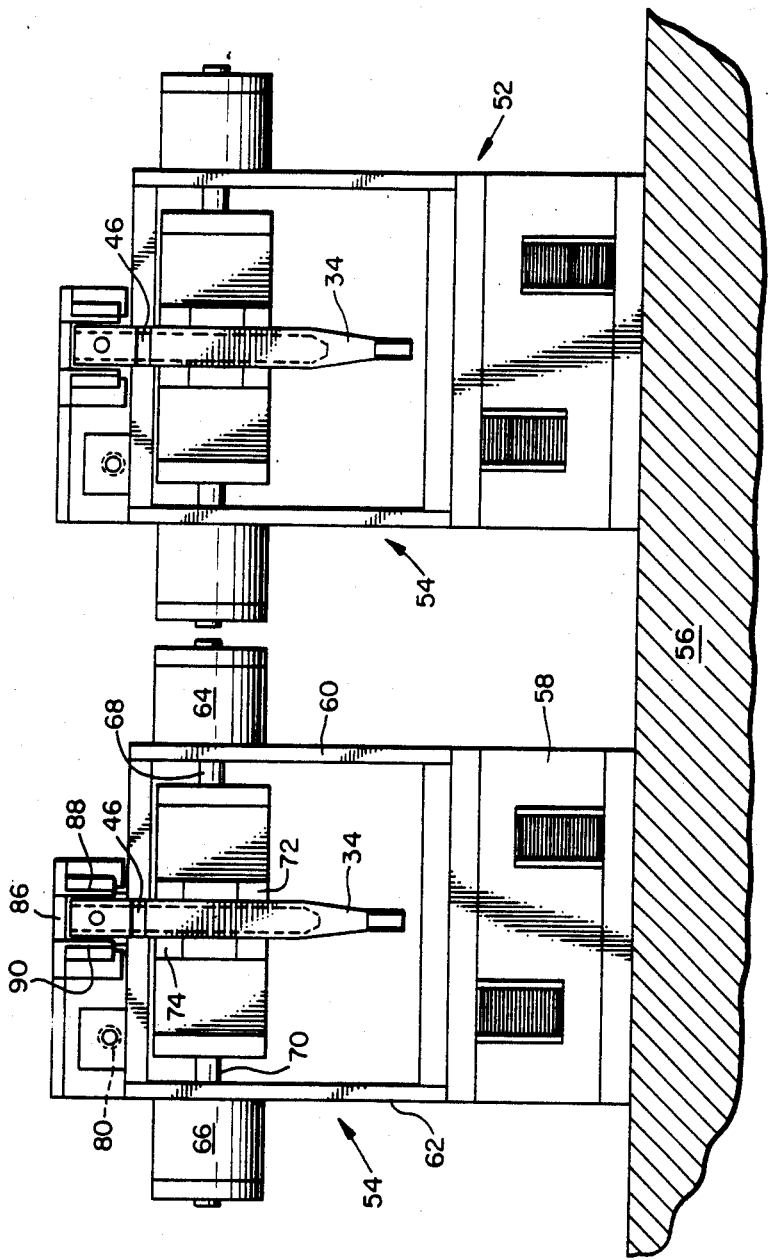

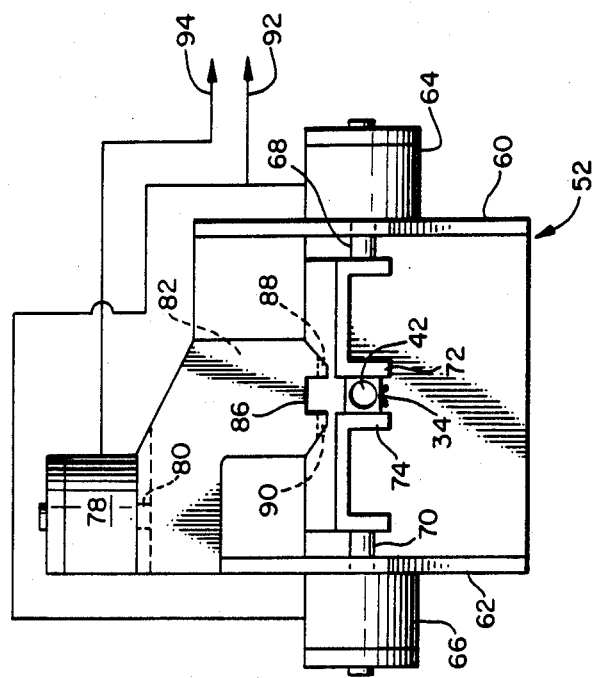
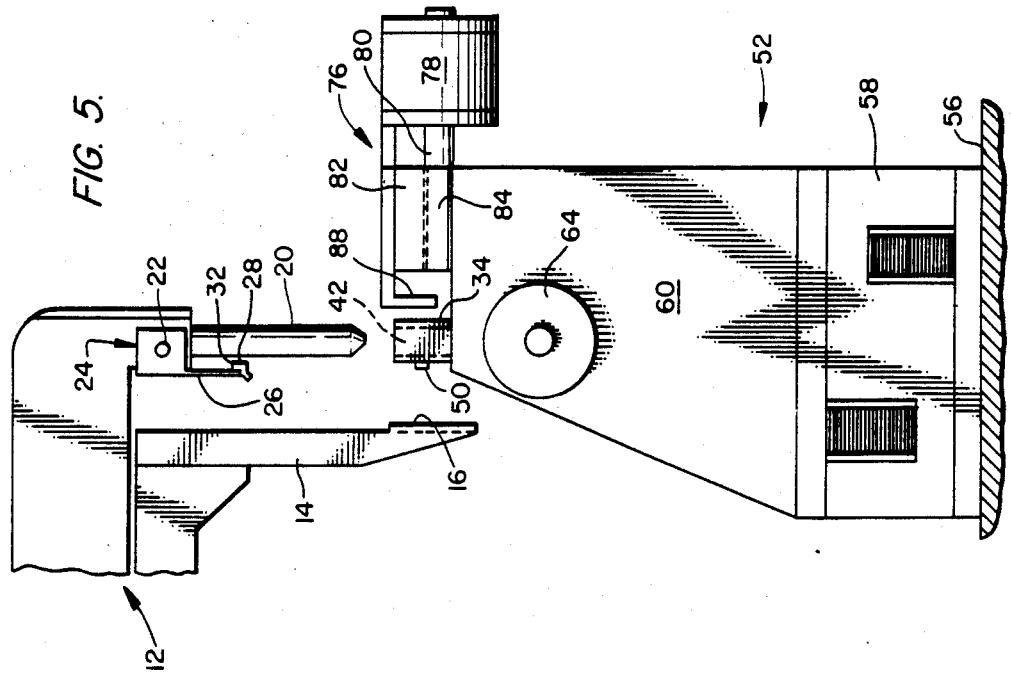

HARNESS FORMATION FINGER INTERCHANGE

The Government has rights in this invention pursuant to Contract No. F19628-C-81-0101 awarded by the U.S. Department of Defense.

TECHNICAL FIELD

The present invention relates to harness formation end-effectors generally, and more particularly to a harness formation finger interchange which will permit insertion tool type fingers to be automatically loaded onto a harness formation end-effector.

BACKGROUND ART

In recent years, processes for manufacturing electrical harnesses wherein a plurality of electrical conductors are inserted into terminals have become progressively automated. Harness formation end-effectors have been developed for automated wire harness formation to effect a desired wire lay while terminating each wire of a wire harness in a particular manner. Devices of this type, such as those illustrated in U.S. Pat. Nos. 4,048,710 to John Peter Nijman and 3,997,956 to William H. McKee, normally employ end-effectors which are dedicated to a particular formation, and thus are permanently provided with a particular type of tool tip. Wire harness formation end-effectors dedicated to a particular type of wire termination arrangement are often too limited for effective use in an automated, robotic harness formation unit, for such units must be adapted to provide wire termination with a number of various contact configurations. When the insertion tool for a robotic end-effector is contact dependent, the end-effector must be manually altered to accommodate contact configurations other than those for which the unit was initially designed. Thus, the particular tool tip on the end-effector must be removed by hand and an appropriate tool tip substituted therefor, thereby creating a manual operation which detracts from the time savings provided by an automated robotic unit.

DISCLOSURE OF THE INVENTION

It is primary object of the present invention to provide a novel and improved harness formation finger interchange for use with a robotic end effector device which is operable to automatically change insertion tool type fingers without human intervention.

Another object of the present invention is to provide a novel and improved harness formation finger interchange for use with a robotic end-effector device including storage sections which are each adapted to store an insertion tool type finger in position for engagement by the robotic end-effector. Each storage section includes a powered tool clamping unit for movement into engagement with an insertion tool finger, and a powered latch release unit which moves into engagement with the latching mechanism provided for the insertion tool finger on the robotic end-effector.

Yet another object of the present invention is to provide a novel and improved harness formation finger interchange for use with a robotic end-effector device adapted to mount an interchangeable insertion tool finger. This finger interchange includes a finger storage mechanism consisting of a powered clamping unit and a powered latch release unit. The clamping unit will position an insertion tool finger so that a mounting shaft on the robotic end-effector can be inserted into a receiving chamber in the insertion tool finger under tight fitting conditions. The loading of a tool finger under these conditions will allow the tip of the finger to be accurately located with respect to a datum line on the end-effector.

A still further object of the present invention is to provide a novel and improved harness formation finger interchange for use with a robotic end-effector which is designed to mount or remove interchangeable insertion tool fingers on the end-effector. This is accomplished by providing a plurality of storage sections for each robot station, and each of the storage sections includes a housing for receiving and storing an elongated insertion tool finger. The insertion tool finger which is inserted into the housing by an end-effector is engaged by two aligned, oppositely disposed power clamping units which are mounted upon opposite walls of the housing and which move inwardly to engage and position the insertion tool finger. To release an insertion tool finger from the robotic end-effector, a powered latch release unit is mounted on the housing to move in a direction substantially normal to the path of movement of the power clamping units. This powered latch release unit passes around a clamped insertion tool finger to engage and release a spring latching mechanism which cooperates with a latching structure formed on the insertion tool finger to lock the insertion tool finger to the robotic end-effector.

These and other objects of the present invention are accomplished by providing a harness formation finger interchange having a support structure for mounting a plurality of insertion tool finger storage stations. Each of these storage stations is formed by a housing which defines a tool storage chamber and which has an opening to receive an insertion tool finger and the tool mounting shaft and tool retaining clip of the robotic end-effector. First and second pneumatic cylinders are mounted upon opposite walls of the housing and are spaced from the opening. These pneumatic cylinders operate piston rods connected to opposed tool clamps, and reciprocate these piston rods in a path which is substantially normal to the longitudinal axis of an insertion tool finger which is moved within the housing. A third pneumatic cylinder is mounted upon the housing and is adapted to operate a piston which reciprocates a clip release mechanism outwardly of the housing chamber and in a path substantially normal to the path of movement of said tool clamps. The clip release mechanism is adapted to move around and on opposite sides of an insertion tool finger which is clamped by the tool clamps within the housing to engage and release the spring clip mounted on the robotic end-effector device to release the tool finger from the device. The first, second and third pneumatic cylinders are all connected to a pneumatic source with control valving to accomplish the desired movement of the piston rods.

BRIEF DESCRIPTION OF THE DRAWINGS

FIG. 1 is a view in side elevation of the tool mounting portion of a robotic end-effector illustrating the mounting mechanism for a removable insertion tool finger;

FIG. 2 is a perspective view showing the spring clip assembly for the robotic end-effector of FIG. 1;

FIG. 3 is a perspective view illustrating a removable insertion tool finger for use with the robotic end-effector of FIG. 1;

FIG. 4 is a view in front elevation of the harness formation finger interchange of the present invention with a stored insertion tool finger in place;

FIG. 5 is a view in side elevation of a storage section for the harness formation finger interchange of FIG. 4; and FIG. 6 is a plan view of the storage section of FIG. 5 with the pneumatic connections therefor shown schematically.

DETAILED DESCRIPTION OF THE PREFERRED EMBODIMENT

FIG. 1 discloses a robot end-effector indicated generally at 10, which is adapted to receive a variety of tool tips according to a desired termination style to be applied to the wires of a wire harness under construction. This end-effector includes a support and operating assembly 12 which is connected to a robotic manipulator (not shown). Extending outwardly from the support and operating assembly is a fixed finger 14 of any desired configuration. As illustrated in FIG. 1, the finger 14 may terminate in an anvil formation 16 which may operated with a suitable cooperating anvil formation on a second removable finger to provide gripping functions for a wire end.

The support and operating assembly 12 includes a lower support section 18 from which a tool support shaft 20 projects in substantially parallel relationship to the fixed finger 14. The support and operating assembly can function under the control of a robotic manipulator to move a removable finger supported on the tool support shaft 20 into cooperating engagement with the fixed finger 14.

Mounted on the lower support section 18 by means of a mounting pin 22 is a spring clip assembly 24 which operates to retain a removable tool finger on the tool support shaft 20. This spring clip assembly is formed of resilient material, such as spring steel, and includes a spring retention arm 26 having a downwardly extending flange 28 formed at one end thereof. As will be noted from FIG. 2, the spring retention arm includes a latch pin receiving aperture 30 extending therethrough, and a pair of laterally projecting ears 32 between the latch pin receiving aperture and the flange 28.

A removable tool finger 34 which is designed for insertion over the tool support shaft 20 is illustrated in FIG. 3. This removable tool finger includes an elongate body 36 having a desired tool tip 38 formed on one end thereof. For purposes of illustration in FIG. 3, the tool tip 38 is formed to provide a second anvil which cooperates with the anvil 16 at the end of the fixed finger 14. However, any one of a number of insertion tool tip configurations can be formed at 38.

The elongate body 36 is provided with a flat end 40 which is opposite to the tool tip 38, and this end is adapted to engage with the lower support section 18 when the removable tool finger 34 is in place on the tool support shaft 20. To permit insertion of the removable tool finger over the support shaft, an opening 42 is provided in the end 40 which communicates with a longitudinally extending, closed end chamber 44 within the elongate body 36.

The tool is latched in place on the tool support shaft 20 by means of a groove 46 formed in the upper surface 48 of the elongate body and positioned to receive the downwardly extending flange 28 of the spring clip assembly 24 when the flat end 40 engages the lower support section 18. Also, in this position, a latch pin 50 extending upwardly from the upper surface 48 projects into the latch pin receiving aperture 30 in the spring retention arm 26.

Referring now to FIG. 4, the harness formation finger interchange of the present invention indicated generally at 52 includes a plurality of storage stations 54 mounted upon a suitable support member 56. For purposes of illustration in FIG. 4, only two storage stations are illustrated, but the harness formation finger interchange would include a plurality of storage stations equal in number to the number of different removable tool finger configurations desired at each robot work space. Each storage station 54 stores one removable tool finger 34.

The individual storage stations 54 each include an open topped housing 58 having sidewalls 60 and 62 which support opposed pneumatic cylinders 64 and 66. These pneumatic cylinders are of conventional design, and include pistons which operate piston rods 68 and 70 having tool clamps 72 and 74 connected respectively to the free ends thereof. The two pneumatic cylinders 64 and 66 operate through the piston rods 68 and 70 to reciprocate the tool clamps 72 and 74 toward or away from engagement with a removable tool finger 34.

A spring slip release assembly 76 (FIG. 5), is mounted at the top of the housing 58 and includes a pneumatic cylinder 78 having a piston operated piston rod 80 which reciprocates a clip release mechanism 82 in a suitable slide or track 84. The forward end of the clip release mechanism is provided with a slot 86 which is formed to permit two downwardly depending clip engaging lips 88 and 90 to move along opposite sides of a removable tool finger 34 held by the tool clamps 72 and 74. These clip engaging lips are formed to engage the laterally projecting ears 32 on the spring retention arm 26 and to flex the spring retention arm so as to move the flange 28 out of engagement with the groove 46 and the latch pin receiving aperture 30 away from latch pin 50.

Controlled operation of the pneumatic cylinders 64, 66 and 78 is achieved by pneumatic lines 92 and 94 connected to a conventional pneumatic reservoir and control valving system. Pressure on these pneumatic lines is controlled to cause the piston rods 68, 70 and 80 to reciprocate toward and away from the respective cylinders 64, 66 and 78. The piston rods 68 and 70 are substantially aligned and reciprocate in a path which is substantially normal to the longitudinal axis of a tool finger 34 which is retained in a storage position by the tool clamps 72 and 74. Similarly, the piston rod 80 and the clip release mechanism 82 reciprocate in a path which is substantially normal to the longitudinal axis of a stored tool finger as well as substantially normal to the path of reciprocation for the piston rods 68 and 70.

INDUSTRIAL APPLICABILITY

The harness formation finger interchange 52 is adapted for use with a robot end-effector 10 having a removable tool finger 34. A plurality of storage stations 54 are included in the harness formation finger interchange provided at each robot work station. Each of the storage stations retains a removable tool finger 34 between the tool clamps 72 and 74 thereof. To automatically change a contact dependent removable tool finger, the support and operating assembly 12 of the robot end-effector 10 is manipulated so that the removable tool finger 34 mounted upon the tool support shaft 20 is inserted into the top opening of an empty storage station 54 between the tool clamps 72 and 74 thereof. Then, the pneumatic cylinders 64 and 66 of this storage station are activated to move the tool clamps into clamping engagement with the removable tool finger, and the pneumatic cylinder 78 is then activated to move the clip release mechanism 82 forwardly until the clip engaging lips 88 and 90 engage the laterally projecting ears 32 on the spring retention arm 26 for the spring clip assembly 24. These clip engaging lips continue to move forwardly to flex the spring retention arm 26 and move the downwardly extending flange 28 thereon out of the groove 46, while the latch pin receiving aperture 30 is moved out of engagement with the latch pin 50. Now the support and operating assembly 12 may be activated to raise the tool support shaft 20 out of the longitudinally extending chamber 44 in the body 36 of the removable tool finger. The tool finger is now completely disengaged from the robot end-effector and is stored in a storage station 54. The pneumatic cylinder 78 may subsequently be activated to retract the clip engaging lips 88 and 90 away from the stored removable tool finger 34.

The robot end-effector 10 will now be positioned above a second storage station 54 which contains the desired tool finger 34. As the end-effector is subsequently moved downwardly by the support and operating assembly 12, the tool support shaft 20 moves into the opening 42 in the longitudinally extending chamber 44 formed in the body of the stored tool finger. Further downward movement of the tool support shaft causes the downwardly extending flange 28 on the spring retention arm 26 to snap over the latch pin 50 and move into the groove 46. At this point, the latch pin 50 will snap into the latch pin receiving aperture 30, and the flat end face 40 on the tool will engage the lower support section 18. With the tool thus secured, the pneumatic cylinders 64 and 66 will be operated to withdraw the tool clamps 72 and 74 from engagement with the previously stored removable tool finger, and the robot end-effector 10 with the new tool in place may now be withdrawn from the storage section 54 and placed into operation.

I claim:

1. A harness formation fingr interchange for use with a robotic end-effector device adapted to mount an interchangeable tool and including a tool support shaft for reception by an internal chamber within said interchangeable tool by movement of said shaft in a solely axial direction and retaining means to releasably latch said removable tool on said robotic end-effector, comprising storage means to store at least one interchangeable tool, said storage means including a housing, powered tool clamping means mounted on said housing to releasably clamp and position said tool to receive said tool support shaft, and powered latch release means mounted on said housing, said powered latch release means being operative to engage said retaining means to release the removable tool from said end effector when a mounted tool is clamped by said powered tool clamping means.

2. The harness formation finger interchange of claim 1 wherein said powered latch release means includes latch engaging means movable in a path substantially transverse to the longitudinal axis of an interchangeable tool clamped by said powered tool clamping means, said latch engaging means including at least one latch engaging surface formed to move along one side of an interchangeable tool clamped by said power tool clamping means to engage said retaining means.

3. The harness formation finger interchange of claim 2 wherein said powered latch release means is mounted above said powered tool clamping means.

4. The harness formation finger interchange of claim 3 wherein said powered latch release means includes a latch power cylinder, a piston rod extending from said latch power cylinder and reciprocal relative thereto, said latch engaging means being connected to said piston rod, and power circuit means connected to provide driving fluid to said latch power cylinder.

5. The harness formation finger interchange of claim 3 wherein said latch engaging means includes two spaced latch engaging surfaces formed to move along opposite sides of an interchangeable tool clamped by said powered tool clamping means to engage said retaining means at two spaced points.

6. The harness formation finger interchange of claim 3 wherein said powered tool clamping means includes first and second clamp power means mounted on said housing in opposed, spaced, substantially aligned relationship, a first tool clamp secured to said first clamp power means and a second tool clamp secured to said second clamp power means, said first and second clamp power means operating to move said first and second tool clamps toward and away from engagement along substantially aligned paths transverse to the longitudinal axis of an interchangeable tool to be gripped thereby.

7. The harness formation finger interchange of claim 6 wherein said first and second clamp power means move said first and second tool clamps in aligned paths substantially normal to the path of movement of said latch engaging means.

8. A harness formation finger interchange for use with a robotic end-effector device adapted to mount an elongate interchangeable tool and including a tool support shaft for reception by a longitudinally extending chamber formed in said tool and extending from a first end thereof and spring clip means mounted on said end-effector device and extending therefrom in substantially parallel spaced relationship to said tool support shaft for releasable engagement with locking means formed on said interchangeable tool, said harness formation finger interchange including a support means, a plurality of tool storage means mounted on said support means, each such tool storage means including a housing defining a tool storage chamber and having an opening to receive said tool support shaft and a tool mounted thereon, first and second powered tool clamping means mounted respectively on said housing on opposite sides of said opening and spaced therefrom, said first and second powered tool clamping means cooperating to releasably clamp and position an interchangeable tool, and each including a tool clamp and clamp power means to move said tool clamp in said tool storage chamber along a path substantially transverse to the axis of a tool support shaft received in said opening, said tool clamps for said first and second clamping means being moved by said clamp power means along substantially aligned paths within said storage chamber, and powered latch release means mounted on said housing and including latch engaging means mounted for movement along a path substantially transverse to the axis of a tool support shaft received in said opening and normal to the paths of movement of said tool clamps, and release power means to move said latch engaging means, said latch engaging means including at least one latch engaging surface formed to move along one side of an interchangeable tool clamped by said powered tool clamping means to engage said spring clip means.

9. The harness formation finger interchange of claim 8 wherein said powered latch release means is mounted above said powered tool clamping means, said latch engaging means being mounted externally of said tool storage chamber for movement above the tool receiving opening in said housing.

10. The harness formation finger interchange of claim 9 wherein said latch engaging means includes two spaced latch engaging surfaces formed to move along opposite sides of an interchangeable tool clamped by said powered tool clamping means to engage said retaining means at two spaced points.

11. The harness formation finger interchange of claim 10 wherein said powered latch release means includes a latch pneumatic cylinder, a piston rod extending from said latch pneumatic cylinder and reciprocal relative thereto, said latch engaging means being connected to said piston rod, and pneumatic cirucit means connected to provide driving fluid to said latch pneumatic cylinder.

12. The harness formation finger interchange of claim 11 wherein said first and second clamp power means each include a clamp cylinder connected to said pneumatic circuit means and a clamp piston rod extending from said latch pneumatic cylinder and reciprocal relative thereto, said clamp piston rod being connected to a tool clamp.

* * * * *